US007743098B2

(12) United States Patent
Anglin et al.

(10) Patent No.: US 7,743,098 B2
(45) Date of Patent: Jun. 22, 2010

(54) MEETING INVITATION PROCESSING IN A CALENDARING SYSTEM

(75) Inventors: Howard Neil Anglin, Austin, TX (US); Chao M. Beck, Austin, TX (US); Juan Francisco Obas, Austin, TX (US); Joey Allen Perry, Pflugerville, TX (US); Reginald Ford Ratcliff, Jr., Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/927,078

(22) Filed: Oct. 29, 2007

(65) Prior Publication Data
US 2009/0112984 A1      Apr. 30, 2009

(51) Int. Cl.
G06F 15/16    (2006.01)
(52) U.S. Cl. ................. 709/204; 709/205; 709/206; 705/8; 705/9
(58) Field of Classification Search ........... 709/204, 709/205, 206; 705/8, 9
See application file for complete search history.

(56) References Cited

U.S. PATENT DOCUMENTS

| 7,108,173 | B1 * | 9/2006 | Wang et al. ............ 235/377 |
| 2004/0064585 | A1 | 4/2004 | Doss et al. | |
| 2004/0088362 | A1 | 5/2004 | Curbow et al. | |
| 2006/0200374 | A1 * | 9/2006 | Nelken ............... 705/9 |
| 2006/0265262 | A1 * | 11/2006 | Kamdar et al. ........... 705/8 |
| 2007/0061712 | A1 | 3/2007 | Bodin et al. | |
| 2008/0109517 | A1 * | 5/2008 | Sarkar et al. ........... 709/206 |
| 2008/0177611 | A1 * | 7/2008 | Sommers et al. ........ 705/8 |
| 2008/0215409 | A1 * | 9/2008 | Van Matre ............. 705/8 |
| 2009/0083377 | A1 * | 3/2009 | Ben-Haim et al. ....... 709/204 |

FOREIGN PATENT DOCUMENTS

EP         1650942 A1     4/2006

* cited by examiner

*Primary Examiner*—Jinsong Hu
(74) *Attorney, Agent, or Firm*—Yee & Associates, P.C.; David A. Mims, Jr.

(57) ABSTRACT

Illustrative embodiments provide a computer implemented method, an apparatus and a computer program product for meeting invitation processing in a calendaring system. In one embodiment, the computer implemented method comprises receiving a meeting invitation request from a user, wherein the meeting invitation includes a set of attributes and analyzing the set of attributes of the meeting invitation request. The computer implemented method further comprises selecting a process from a set of predefined processes comprising a pending meeting indicator process, a multiple meeting display process, an availability probability process, and a prioritized list process to create a selected process, and selectively modifying the selected process to create a modified process. The computer implemented method then invoking the modified process to process the meeting invitation request, and notifying the user.

20 Claims, 8 Drawing Sheets

| and optional can attend. | | | | | | | | | |
|---|---|---|---|---|---|---|---|---|---|
| Thursday, October 26, 2006 | | | | | | | | | |
| am | 10 am | 11 am | 12 pm | 1 pm | 2 pm | 3 pm | 4 pm | 7 am | 8 am |
| | | | | | | | | | |
| | | | | | | | | | |
| | | | | | | | | | |
| | | | | | | | | | |

500

502 PENDING MEETING

- 602 START
- 604 RECEIVE FIRST REQUEST
- 606 RECEIVE ANOTHER REQUEST
- 608 SAME TIME? — NO →
- YES ↓
- 610 INDICATE TO THE REQUESTER A CONFLICT WITH PENDING MEETING
- 612 PROMPT REQUESTER TO RESCHEDULE
- 614 RESCHEDULE PERFORMED? — YES (loop back) / NO
- 616 NOTIFY REQUESTER OF CONFLICT
- 618 DELIVER INVITATION TO INVITEE'S INBOX
- 620 END

MEETING INVITATION PROCESSING IN A CALENDARING SYSTEM

BACKGROUND OF THE INVENTION

1. Field of the Invention

The present invention relates generally to an improved data processing system and in particular a computer implemented method, an apparatus and a computer program product for meeting invitation processing in a calendaring system.

2. Description of the Related Art

Currently in calendaring systems, such as Lotus Notes®, from IBM®, the function of managing calendar and meeting invitations is typically managed by the individual user. In some circumstances, a user may receive multiple invitations for different meetings scheduled to occur at the same time. In these situations, the user is typically responsible to check the invitations and determine which one has a higher priority by accepting one invitation and declining the other invitations.

Sometimes, the user may not be aware there are two or three invitations in the user's inbox for the same time and may accept the first invitation seen, only to realize later there is a desire to accept one of the other invitations. To eliminate this problem, users require a better way to manage calendar invitations and other calendar related events.

SUMMARY OF THE INVENTION

Illustrative embodiments provide a computer implemented method, an apparatus and a computer program product for enhanced meeting invitation processing in a calendaring system. In one embodiment, the computer implemented method comprises receiving a meeting invitation request from a user, wherein the meeting invitation includes a set of attributes, and analyzing the set of attributes of the meeting invitation request. The computer implemented method further comprises selecting a process from a set of predefined processes comprising a pending meeting indicator process, a multiple meeting display process, an availability probability process, and a prioritized list process to create a selected process and selectively modifying the selected process to create a modified process. The computer implemented method further comprises invoking the modified process to process the meeting invitation request, and notifying the user.

In another illustrative embodiment, an apparatus in the form of a data processing system comprises a bus, a memory connected to the bus, wherein the memory contains computer usable program code, a processor unit connected to the memory and the bus, wherein the processor executes the computer usable program code to create, a receiver capable of receiving a meeting invitation request from a user, wherein the meeting invitation includes a set of attributes, a comparator capable of analyzing the set of attributes of the meeting invitation request, a selector capable of selecting a process from a set of predefined processes comprising a pending meeting indicator process, a multiple meeting display process, an availability probability process, and a prioritized list process to create a selected process, a rules processor capable of selectively modifying the selected process to create a modified process, a meeting invitation application capable of invoking the modified process to process the meeting invitation request, and a notifier capable of notifying the user.

In yet another illustrative embodiment, a computer program product comprises computer usable program code tangibly embodied on a computer usable recordable type medium, the computer usable program code comprising, computer usable program code for receiving a meeting invitation request from a user, wherein the meeting invitation includes a set of attributes, and computer usable program code for analyzing the set of attributes of the meeting invitation request. The computer program product further comprises computer usable program code for selecting a process from a set of predefined processes comprising a pending meeting indicator process, a multiple meeting display process, an availability probability process, and a prioritized list process to create a selected process, and computer usable program code for selectively modifying the selected process to create a modified process, computer usable program code for invoking the modified process to process the meeting invitation request, and computer usable program code for notifying the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a pictorial diagram of a graphical user interface including a pending meeting notification, in an illustrative embodiment;

FIG. 6 is a flowchart of a pending meeting process in an illustrative embodiment;

DETAILED DESCRIPTION OF THE PREFERRED EMBODIMENT

Figure 1:
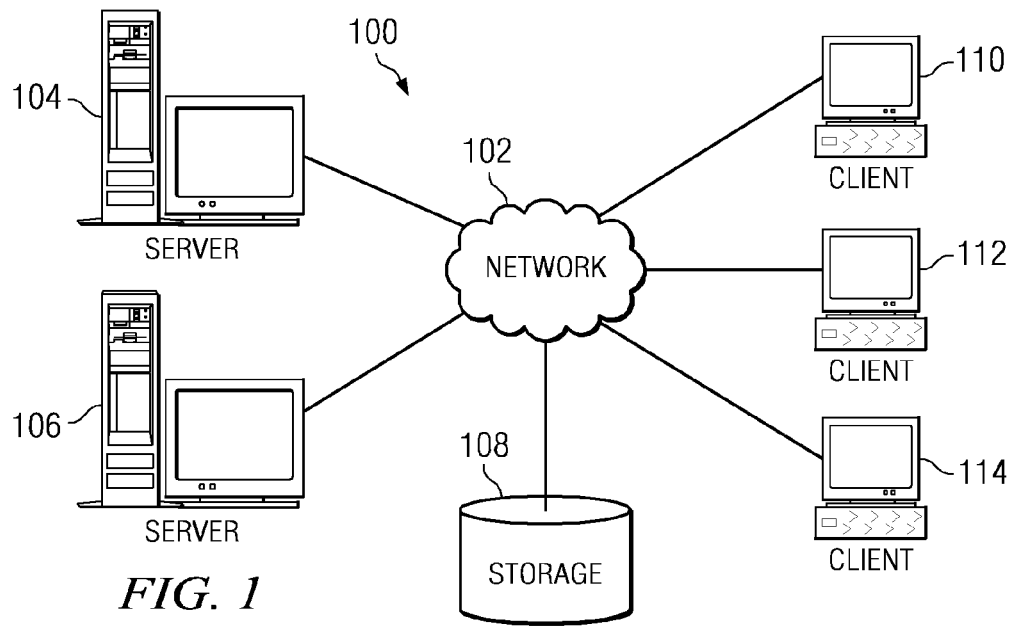
FIG. 1 is a pictorial representation of a network of data processing systems in which illustrative embodiments may be implemented.
Figure 2:
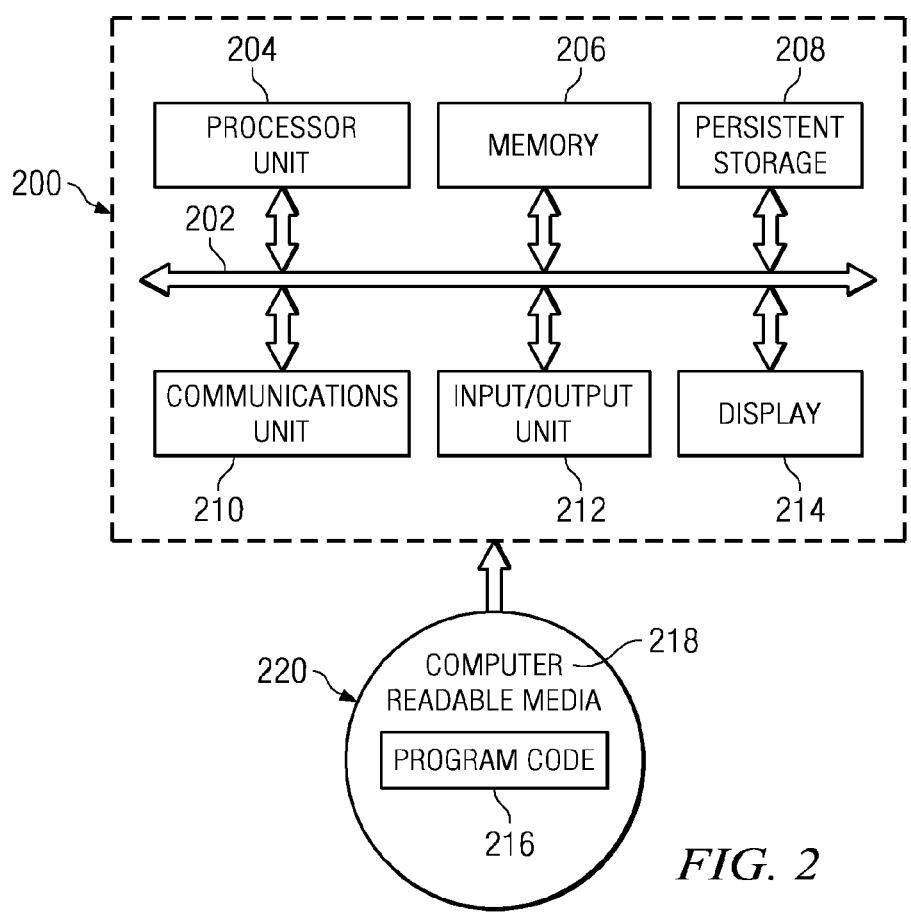
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. An apparatus in the form of data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrated embodiments provide capabilities for users to more effectively manage calendar meeting invitations by automating selected functions of an existing calendaring system. For example, capabilities are provided in the form of a set of processes, including one or more of, a pending meeting indicator process, a multiple meeting display process, a probability generator for availability process, and automatic meeting acceptance using a prioritized list of senders process, also known as a prioritized list process.

A calendaring system, in accordance with illustrative embodiments, typically provides capabilities for querying pending calendar invitations, in other words, invitations that have been received, but have not been accepted, in order to determine schedule availability. A user or agent scheduling a meeting is then typically able to determine the potential schedule availability of another user who has pending calendar invitations, and based on the potential schedule availability sends a proposed calendar invitation that is contingent on the status and/or acceptance of the pending calendar invitation.

Figure 3:
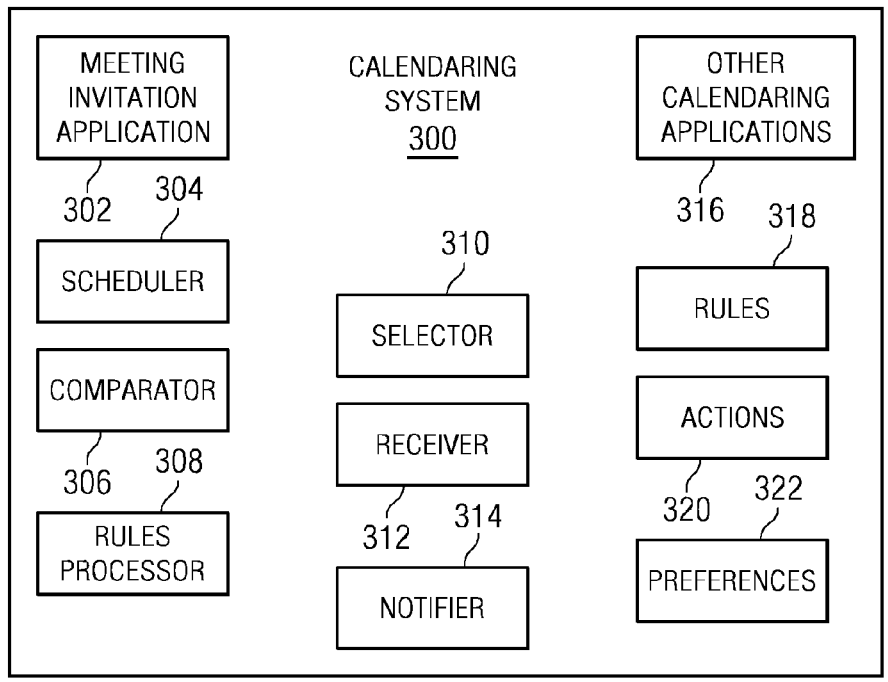
FIG. 3 is a block diagram of selected meeting handling components of a calendaring system, in an illustrative embodiment.

With reference to FIG. 3, a block diagram of selected meeting handling components of a calendaring system, in an illustrative embodiment is shown. Calendaring system 300 is comprised of a number of related components, a portion of which are illustrated. Invitation application 302 provides processing support capability for calendar events directed to meetings. Other calendaring applications 316 may be selected to provide process support for other calendar events, such as printing a calendar, viewing another user calendar, or providing interfaces to different calendar systems.

Scheduler 304 provides a capability to schedule a selected calendar event with respect to a specified date and time. Comparator 306 provides a capability for comparison to determine if there is a conflict among calendar entries with respect to date, time, sender or other meeting invitation and user preference attributes. Comparator 306 also determines when a rule match has been attained.

Rules processor 308 provides a capability to process calendar related rules as may be found in rules database 318. Rules are typically expressed in the form of a subject, a condition, and an action for a specific event. For example, a rule for a meeting invitation or a calendar event may be invoked when a condition is met (for example, the invitation was determined to have come from a specific sender) and an action is to be performed (for example, the invitation is to be accepted automatically).

Selector 310 provides a capability to choose from a number of elements, such as when a plurality of meeting invitations or a number of preferences may be presented on a graphical user interface. Such selections are typically responsive to a prompt by the calendaring system 300 to the user to provide input to the calendaring process.

Receiver 312 provides a capability to accept requests from users of the calendaring system 300. Notifier 314 provides a capability to send warnings or other messages to users of the calendaring system.

Actions 320 provide a capability to act on the requests received in accordance with the specified rule. Actions may be in the form of methods directing specific processes to be invoked according to the situation of the calendar event or the condition passed in the request, as reflected in the appropriate rule.

Preferences 322, also referred to as user preferences, provide a capability for users or administrators to provide selected configurable values to the processes of the calendaring system. Preferences 322 provide a collection of initial values for the configurable attributes of the calendaring system. A portion of the configurable attributes pertain to meeting notices. For example, a color of red may be specified as the color for the attribute "not available," to be used when indicating to a user that a time slot has been booked.

In a first example, a pending meeting indicator capability is provided. A calendaring system 300, such as Lotus Notes, may be enhanced to include a "pending meeting indicator." The indicator may be represented by a color, such as yellow, displayed on a calendaring screen of the graphical user interface, to inform the person who wants to schedule a meeting of a pending conflict when checking with scheduler 304. Similarly, when an invitation has been received by a user, the receiving user would be notified of the potential conflict between the newly received invitation and invitations that were received previously, but which have not been accepted or rejected yet. When this capability is enabled, a user scheduling a meeting will be able to see not only the available and non-available times of the requested user, but also the pending meeting times of meeting invitations for which the requested user has not yet responded.

Figure 4:
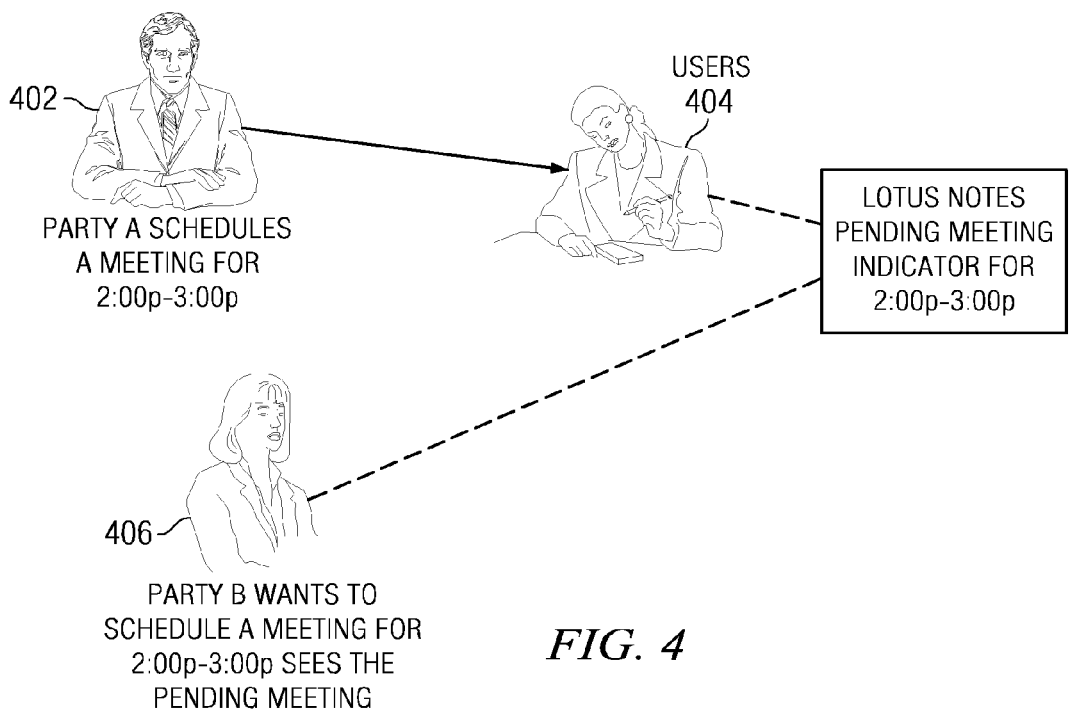
FIG. 4 is a block diagram of a pending meeting request, in an illustrative embodiment.

With reference to FIG. 4, a block diagram of a pending meeting request, in an illustrative embodiment is shown. In this example, a first user A 402 sends a meeting invitation for a time period of 2:00pm-3:00pm to a second user C 404. A third user B 406 sends an invitation to the second user C 404 requesting a meeting for the same time period of 2:00pm-3:00pm. Third user B 406 uses the scheduler 304 of FIG. 3 to see the availability of user C 404 at 2:00pm-3:00pm. Third user B 406 will see that the slot for the meeting time requested is marked yellow indicating there is another meeting tentatively scheduled for that time slot which the requested user, user C 404, has not responded to yet.

The third user B 406 then has the option to schedule the meeting at another time. The meeting can be scheduled for the time period from 2:00pm-3:00pm, but the user will receive a warning that the second user C 404 has a pending meeting at the requested time and may not make this meeting.

With reference to FIG. 5, a pictorial diagram of a graphical user interface including a pending meeting notification, in an illustrative embodiment is shown. A portion of a graphical user interface 500 provides a sample of an illustrative embodiment in which a pending meeting notification is provided. In accordance with an illustrative embodiment, a time slot 502 of between 2:00pm-3:00pm has been colored to indicate a pending meeting, as would be seen by a user requesting invitee availability information from the scheduler 304 of FIG. 3.

Referring now to FIG. 6, a flowchart of a pending meeting process in an illustrative embodiment is shown. Process 600, of meeting invitation application 302 of FIG. 3, begins at start 602 and progresses to receive a first request for a meeting at a specified time for a specified user (step 604). The specified user may be more than one user. Since the invitee has not responded to this request, it becomes a pending meeting invitation. Process 600 then receives another request for a meeting inviting a user or users (step 606). This second meeting invitation request is compared to any pending meeting invitations that this invitee already has in order to determine if the meeting times are the same (step 608).

If no similarities are determined in step 608, a "no" results and process 600 moves to deliver the meeting invitation to the invitee's inbox so it can be processed as usual (step 618). Process 600 ends thereafter (step 620).

If similarities are determined in step 608, a "yes" results and process 600 provides notification to the meeting requester that the invitee has a pending meeting invitation for that same time slot (step 610). A user receiving a notification of a pending meeting is then prompted to reschedule the meeting (step 612). A response from the user prompt is analyzed to determine if the requester rescheduled the meeting. If the meeting was rescheduled, a "yes" results; otherwise, a "no" results (step 614). If a "yes" is determined in step 614, process 600 returns to step 608 to determine if a conflict exists between the rescheduled meeting invitation and any other pending meeting invitations that the invitee has received, but not acted upon yet. Otherwise, if a "no" was determined in step 614, the requester would be notified of the conflict (step 616). The meeting invitation then would be delivered to the invitee's inbox so it can be processed as usual (step 618). Process 600 ends thereafter (step 620).

Figure 7:
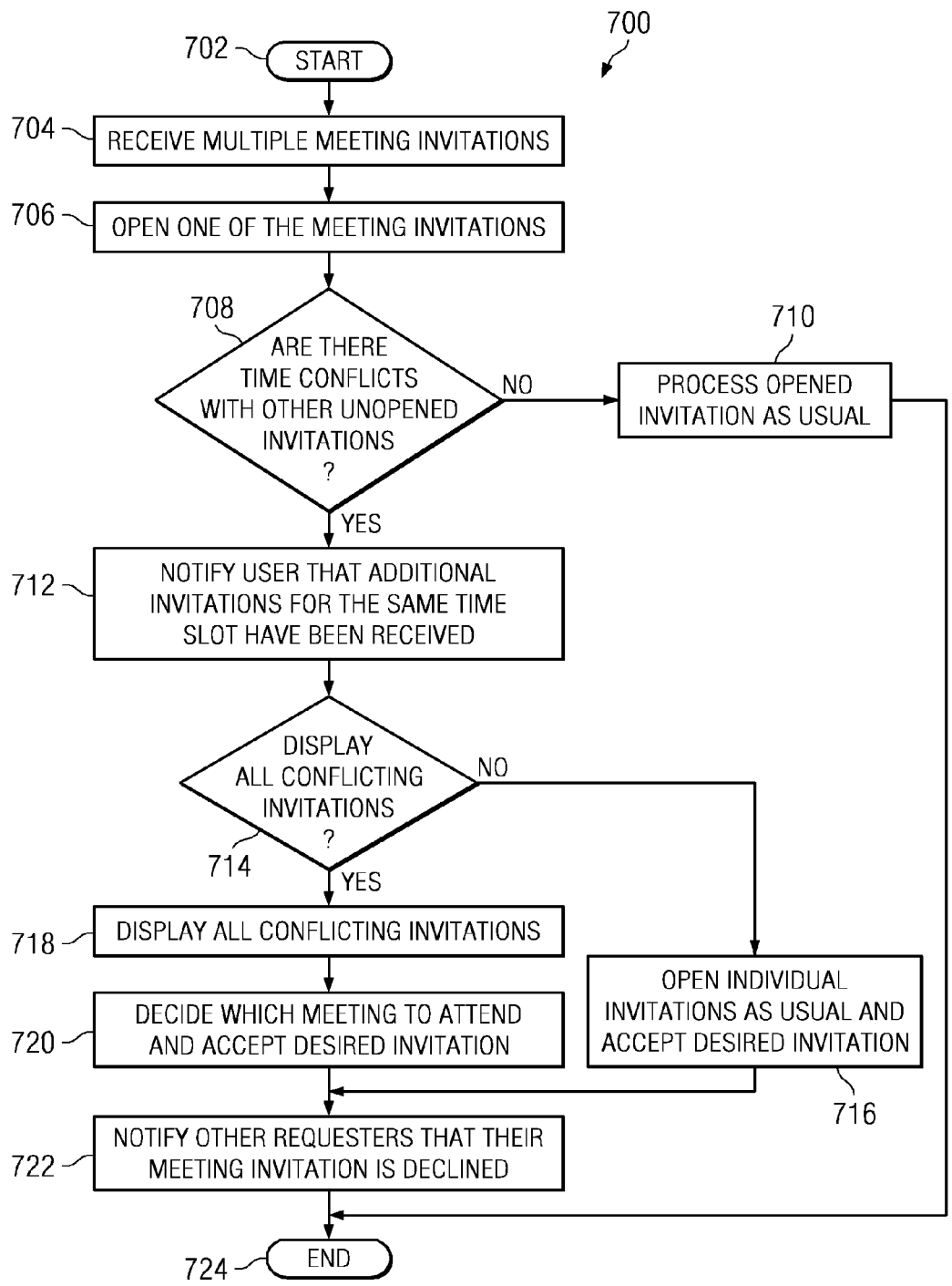
FIG. 7 is a flowchart of a plurality of meeting requests process in an illustrative embodiment.

With reference to FIG. 7, a flowchart of a plurality of meeting requests process in an illustrative embodiment is shown. The plurality of meeting requests process is a portion of meeting invitation application 302 of FIG. 3. For this type of scenario, wherein multiple users are to be notified that a pending meeting invitation for a specific time slot has been declined, each pending invitation object or instance needs to be aware of other invitation objects, in a particular calendar instance. Each unique meeting invitation instance of a respective user would communicate, without the intervention of the calendar user, with each other meeting invitation instance to determine whether the meeting invitation instance shares a similar or overlapping time attribute. At this point, one of the meeting invitations would be accepted and each unaccepted meeting invitation instance for a given calendar would relay a decline notification back to the original scheduler.

Process 700 of meeting invitation application 302 of FIG. 3 begins at start (step 702) and proceeds to receive multiple meeting invitations (step 704). Despite the presence of the pending meeting indicator, some of these meeting invitations could be for the same time and date. The receiver proceeds to open one of the meeting invitations (step 706). The meeting invitations are analyzed using a comparator function to determine if a time and date conflict exists between them (step 708). If there is a conflict, a "yes" results; otherwise, a "no" results (step 708). If a "no" results in step 708, then the user processes the opened meeting invitation in the normal manner (step 710). Process 700 ends thereafter (step 724). If a "yes" is determined in step 708, Process 700 notifies the receiver that additional invitations for the same time slot have been received (step 712).

Process 700 then prompts the user to ask if the calendaring system should display the conflicting invitations (step 714). Any meeting invitations that do not conflict will be left in the user's inbox to be processed in the usual manner. The user response to the prompt of step 714 is then analyzed. If a "no" is determined in step 714, the user wants to manually open the meeting invitations in the user's inbox and accept the desired invitation (step 716). After accepting the desired invitation, processing continues to step 722. If a "yes" is determined in step 714, the calendaring system displays all conflicting meeting invitations (step 718). The user then goes through the list and decides which meeting invitation to accept (step 720).

Once a meeting invitation has been accepted (at either step 716 or step 720), the requesters of the remaining conflicting meeting invitations will be notified automatically that the user has declined their meeting invitation (step 722). Process 700 ends thereafter (step 724).

Figure 8:
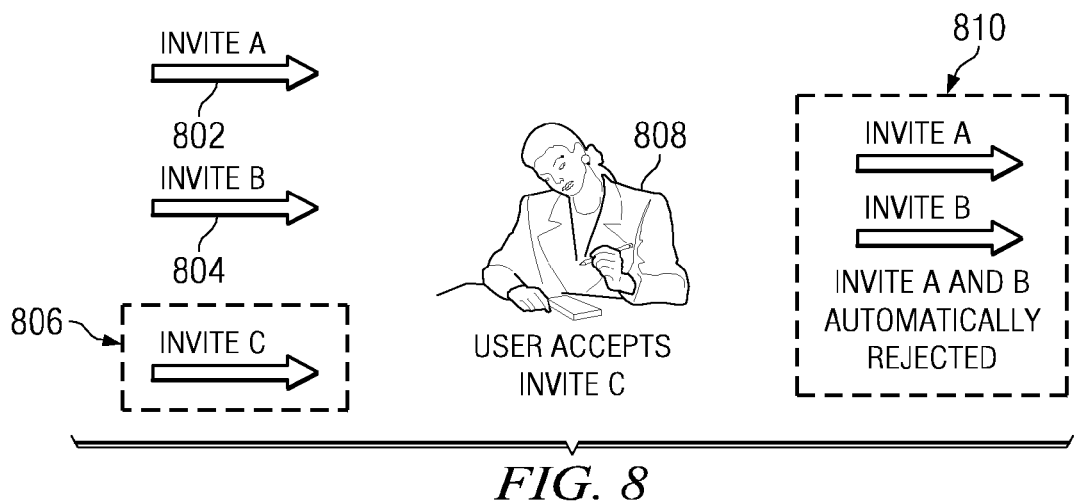
FIG. 8 is a block diagram of a plurality of meeting requests process in an illustrative embodiment.

With reference to FIG. 8 a block diagram of a plurality of meeting requests process in an illustrative embodiment is shown. The plurality of meeting requests process is a portion of meeting invitation application 302 of FIG. 3. In the example shown, multiple requests are received, one is accepted and the remaining requests are rejected as declined. Multiple requests in the form of invite A 802, invite B 804, and invite C 806 have been submitted to a user 808 for consideration and acceptance. User 808 accepts invite C 806 causing invite A 802 and invite B 804 to be automatically rejected using the combination of comparator 306 with rules processor 308 usign rules 318 and actions 320 in conjunction with scheduler 304. A capability of the enhanced calendaring system to automatically decline or reject the conflicting invitations is configurable through the user preferences, such as preferences 322. If the user decides to disable this feature, the other conflicting invitations will be left in the user's inbox.

Figure 9:
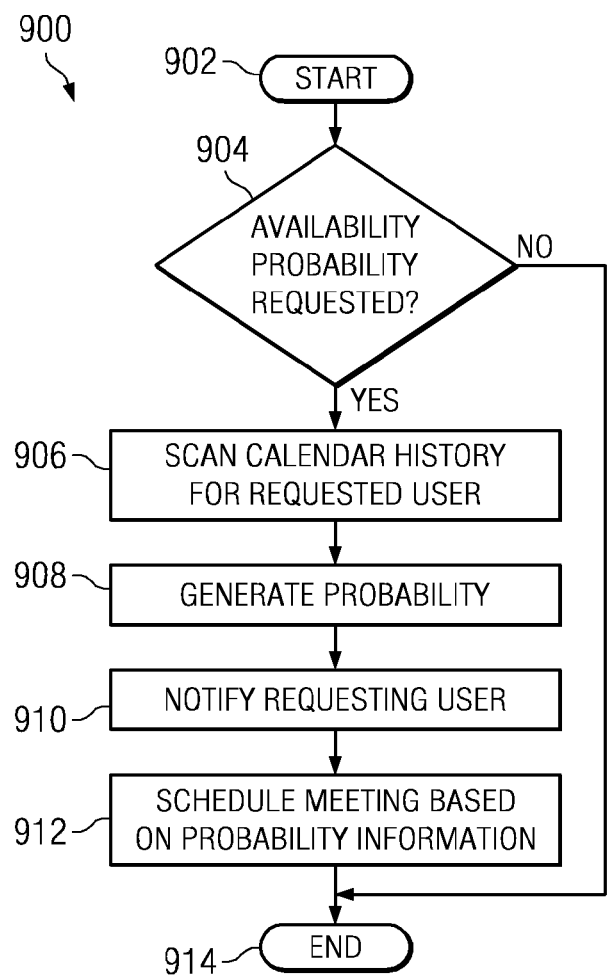
FIG. 9 is a flowchart of an availability probability process in an illustrative embodiment.

With reference to FIG. 9, a flowchart of an availability probability process in an illustrative embodiment is shown. In an illustrative embodiment an enhancement to Lotus Notes would provide a capability of a probability generator and further include via a graphical user interface, a probability generator button to activate the function. The availability probability process is a portion of meeting invitation application 302 of FIG. 3.

Availability probability process 900 begins at start (step 902) and monitors request activity to determine if a request was received by receiver 312 to calculate the availability probability for a specified user (step 904). If request to perform a calculation was received, a "yes" results in step 904; otherwise a "no" results.

If the result of step 904 was a "no" process 900 would skip to end (step 914) and then monitor requests. If however, a "yes" was determined in step 904, a scan of the calendar history of the specified user would be performed (step 906). A probability generator component of rules processor 308, of FIG. 3, would typically scan a user's calendar for a predetermined number of prior months to determine a probability of availability on different days and times. The range of scan coverage is a configurable amount so that the number of months that the calendar system should scan when generating the probability is configurable by the user via a preferences dialog interfacing with preferences 322 of FIG. 3.

For example, an initial value of the last quarter may be used to determine the invitee general availability pattern. Other time periods may be specified as typically used amounts of time, such as number of months, last year, semi-annual or using days and weeks, as convenient. Information being scanned includes the specified user's busy times and free times to determine the probability that the user will be available to accept a meeting invitation request.

Having performed a scan, data is collected and processed using typically available probability calculation routines (step 908). For example, a probability calculation routine may sum the busy time found in the time period and subtract that sum from the total time to yield a free time. This free time result would then be divided by the total time for the period to produce an availability probability.

The requesting user would then be notified by notifier 314 of FIG. 3, of the calculated availability probability (step 910). The requester then schedules, using scheduler 304, of FIG. 3, a meeting based on information obtained (step 912). Process 900 ends thereafter (step 914). The availability probability would then allow a sender of a meeting invitation request to better determine the availability of an invited user on a certain day and at a certain time.

For example, a user's calendar may show the user is available during a particular time slot when they are not, simply because the entry in that time slot has not been added, perhaps because the calendar event is for a routine meeting. The sender of the meeting request has no way of knowing if there is a tentative meeting at that time slot. However, with the use of the probability generator, the meeting requester would typically see that the desired time slot may not be available most of the time, as in the case of recurring meetings.

The capabilities provided by the probability generator may also be useful for repeating meeting invitations. The meeting invitation sender would be able to better predict dates and times that would work best for a repeating meeting with the assistance of the probability generator component providing availability probabilities for meeting invitees. The probability generator would generate an availability probability associated with each invitee for a particular time slot.

Figure 10:
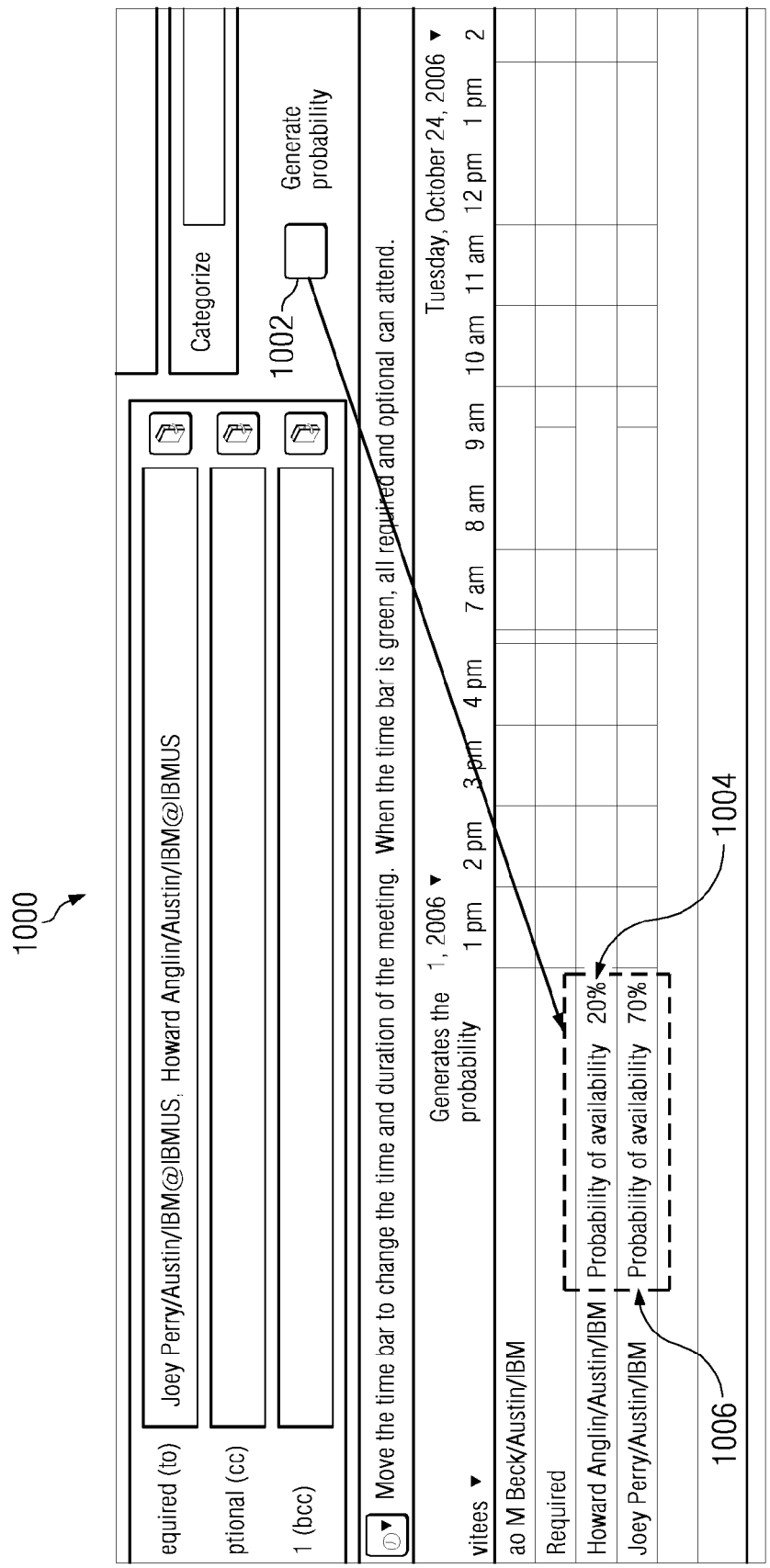
FIG. 10 is a pictorial diagram of a graphical user interface including an availability probability in an illustrative embodiment.

With reference to FIG. 10, a pictorial diagram of a graphical user interface including an availability probability in an illustrative embodiment is shown. The graphical user interface may typically be provided by the calendaring system 300 of FIG. 3. A portion of a graphical user interface 1000 is shown including a button 1002 enabling a user to generate an availability probability. The result of a request to perform the availability probability calculation is then displayed in the graphical user interface. Probability of availability 20% 1004 is shown for a user named Howard and probability of availability 70% 1006 is shown for a user named Joey. The calculation was performed for the two required attendees.

Invitee Joey has a higher probability of availability than invitee Howard as indicated; therefore Howard may cause the meeting to be rescheduled. The requester may then use the calculated information to better schedule a meeting to increase the probability that the required invitees will be able to attend.

Figure 11:
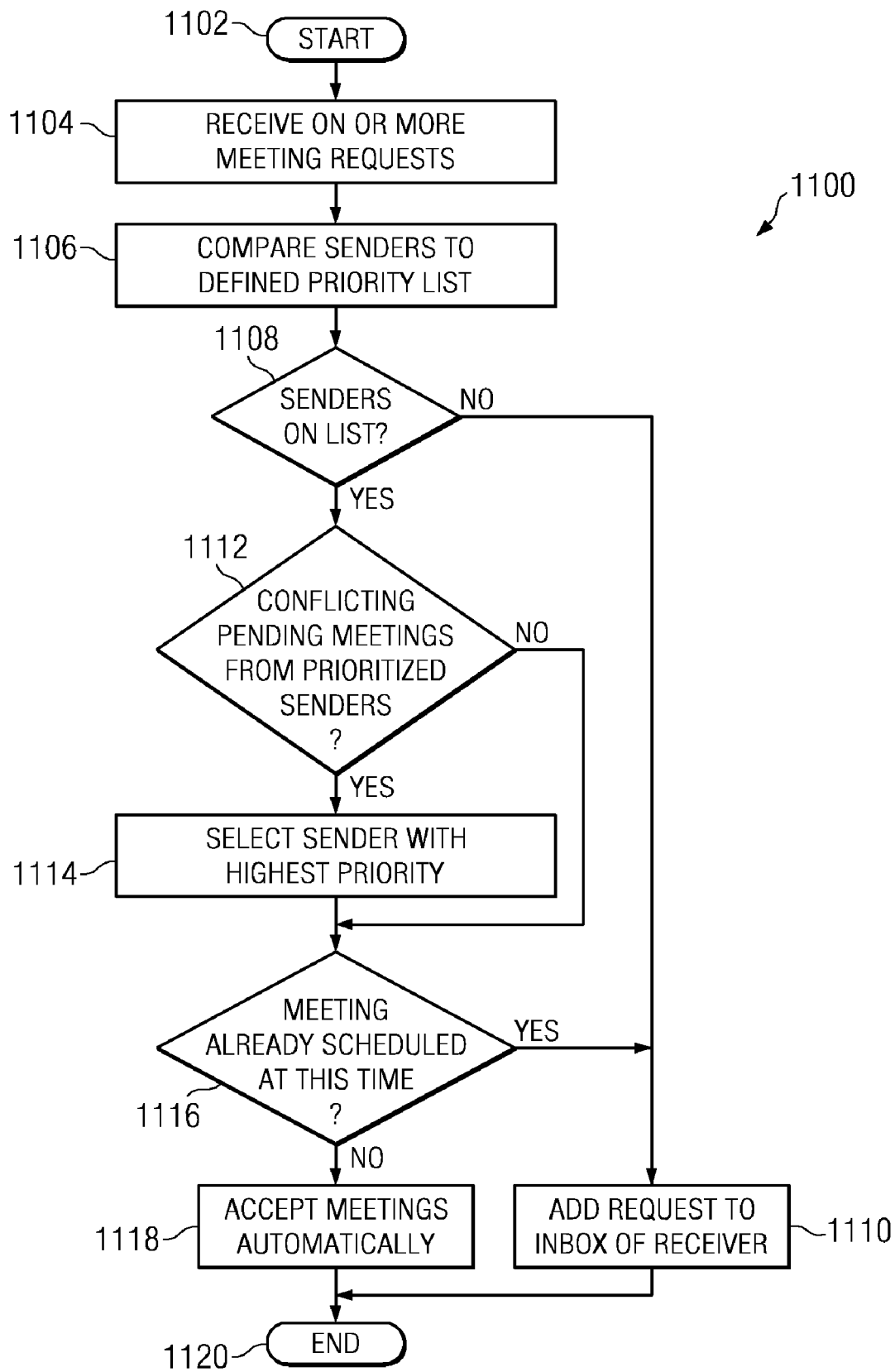
FIG. 11 is a flowchart of a prioritized list process in an illustrative embodiment.

With reference to FIG. 11, a flowchart of an invitation process using a prioritized list in an illustrative embodiment is shown. The invitation process is a portion of meeting invitation application 302 of FIG. 3. Process 1100 starts (step 1102) and proceeds to receive one or more meeting requests (step 1104). Once the meeting invitations are received by a user, using receiver 312 of FIG. 3, the calendaring system compares, using comparator 306 of FIG. 3, the identification of the senders of the invitations with the prioritized list of the user (step 1106). A determination is then made to establish if any of the senders are members of the user's prioritized list (step 1108).

If there is no match in the comparison of step 1108, then none of the senders are on the prioritized list and a "no" result is obtained in step 1108. If, however, any of the senders are found to be a member of the prioritized list, a "yes" results in step 1108. If the result of step 1108 is a "no"none of the sending users are on the receiving user's prioritized list, so none of the invitations will be accepted, and all of the invitations will go into the receiving user's inbox as they normally would (step 1110). Process 1100 ends thereafter (step 1120).

However, having received a "yes" in step 1108, another determination is performed to establish if there are multiple pending meeting invitations which are scheduled for the same time and for which the senders are on the prioritized (step 1112). If a "no" was determined in step 1112, there are no conflicting, pending meetings. Process 1100 would then check each of the meeting invitations that were received from users on the prioritized list to see if a meeting is already scheduled at the same time as any of those meetings (step 1116).

For each meeting invitation from a prioritized sender where no previous meetings are scheduled already, a "no" will result in step 1116, and those meeting invitations from the prioritized senders will be accepted automatically (step 1118). For each meeting invitation from a prioritized sender where a meeting is scheduled already, a "yes" will result in step 1116, and those meeting invitations from the prioritized senders will be placed in the receiver's inbox (step 1110). If a "yes" was determined in step 1112, then there are multiple pending meeting invitations from prioritized senders which are scheduled for the same time. In this case, the sender having the highest priority in the prioritized list would be selected (step 1114) and the remaining meeting invitations would be placed in the receiver's inbox.

Having selected the highest priority sender, process 1100 would then check to determine if a meeting is already scheduled at the same time as this meeting (step 1116). If there was a meeting previously scheduled at the same time, a "yes" would result in step 1116, otherwise a "no" would be obtained. If a "no" result was obtained in step 1116, the meeting would then be accepted automatically and scheduled using scheduler 304 of FIG. 3 (step 1118). Process 1100 thereafter ends (step 1120).

If a "yes" was obtained in step 1116, a meeting is already scheduled for the time slot, and none of the invitations received will be accepted and all invitations will be placed into the inbox of the receiving user. The receiving user will be notified, using notifier 314 of FIG. 3, that there is an invitation from a sender in the priority list to review and resolve (step 1110). Process 1100 ends thereafter (step 1120).

Figure 12:
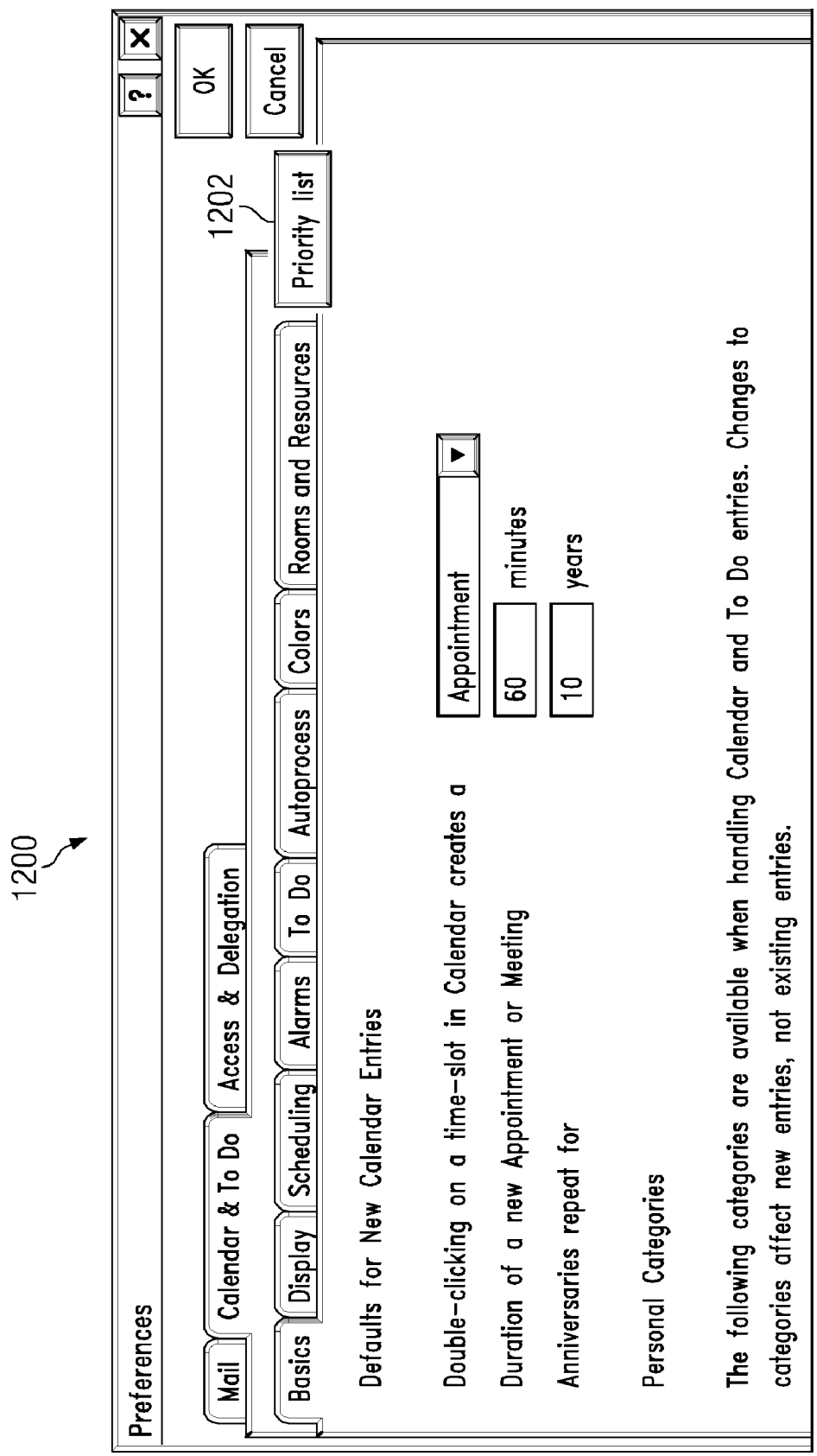
FIG. 12 is a pictorial diagram of a graphical user interface including a "Priority list" tab in an illustrative embodiment.

With reference to FIG. 12, a pictorial diagram of a graphical user interface including a prioritized list tab in an illustrative embodiment is shown. The graphical user interface is typically provided by calendaring system 300 of FIG. 3. In an illustrative embodiment, an enhanced Lotus Notes provides a capability for a user to initialize a prioritized list of users from whom the user would like to automatically accept a meeting invitation. This capability may be provided to a user through an addition to the graphical user interface as a tab added under the function of user preferences for calendar and to do items.

A portion of graphical user interface 1200 is shown with a tab 1202 labeled "Priority list." Navigating to this tab will allow the user to manage the members of the list to establish the desired composition.

In an alternative illustrative embodiment of the process described in FIG. 7, involving an "automatic decline notification," a user may be provided with the capability to disable this feature. Selectively using the automatic decline may be useful where the user needs to accept two conflicting invitations, with the appropriate comments.

In this case, the user desires to end one engagement in time to join the other engagement, to have the other engagement rescheduled when additional information becomes available, or, due to an urgent meeting scheduled which necessitates a reschedule of a meeting. This provides a capability of suppressing the automatic behavior of forcing the user to choose upfront engagements to accept, and what engagements to reject.

This flexibility enables the previously proposed capability to include an override option where schedule conflicts do not need to be reconciled upfront, or where urgent engagements impact existing schedules. The ability for the user to enable and disable this feature of automatic decline notification can be presented to the user when the user attempts to accept an invitation.

Illustrated embodiments provide the capability to more effectively manage calendar meeting invitations by automating a subset of functions of an existing calendaring system. Examples provided illustrate use of a set of processes including a pending meeting indicator process, a multiple meeting display process, a probability generator for availability process, and automatic meeting acceptance using a prioritized list of senders process.

A calendaring system, in accordance with illustrative embodiments, typically provides capabilities for querying pending calendar invitations, in other words, invitations that have been received, but have not been accepted, in order to determine schedule availability. A user or agent scheduling a meeting is then typically able to determine the potential schedule availability of another user who has pending calendar invitations, and based on the potential schedule availability sends a proposed calendar invitation that is contingent on the status and/or acceptance of the pending calendar invitation.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (1) a computer readable storage medium including an electronic, magnetic, optical, electromagnetic, infrared, or semiconductor system (or apparatus or device) or (2) a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill n the art to understand the invention for various embodiments with various modifications as are suited to the particular use contemplated.

What is claimed is:

1. A computer implemented method for meeting invitation processing in a calendaring system, the computer implemented method being performed by a computer and comprising computer-performed steps of:
   receiving a meeting invitation request from a user, wherein the meeting invitation includes a set of attributes;
   analyzing the set of attributes of the meeting invitation request;
   selecting a process from a set of predefined processes comprising a pending meeting indicator process, a multiple meeting display process, an availability probability process, and a prioritized list process to create a selected process;
   selectively modifying the selected process to create a modified process;
   invoking the modified process to process the meeting invitation request; and
   notifying the user.

2. The computer implemented method of claim 1 wherein receiving a meeting request comprises:
   receiving a plurality of requests.

3. The computer implemented method of claim 1 wherein selectively modifying the process comprises:
   selectively modifying the process using preferences data.

4. The computer implemented method of claim 1 wherein the pending meeting indicator process comprises a process in which each of a pending meeting invitation instance communicates with each of another pending meeting invitation instance to share time and date attribute information.

5. The computer implemented method of claim 1 wherein the multiple meeting process comprises selectively processing concurrent meeting invitations and selective enablement of an automatic decline notification.

6. The computer implemented method of claim 1 wherein the availability probability process comprises a process in which a user selectable activation button is placed in a graphical user interface and user notification of a calculated result associated with all required invitees occurs.

7. The computer implemented method of claim 1 wherein the prioritized list process comprises a process that schedules a meeting for a selected meeting invitation in which a selected invitation is selected from a plurality of meeting invitations based on a priority of a requesting user within a prioritized list.

8. A data processing system for meeting invitation processing in a calendaring system, the data processing system comprising:
   a bus;
   a memory connected to the bus, wherein the memory contains computer usable program code;
   a processor unit connected to the memory and the bus, wherein the processor executes the computer usable program code to create:
   a receiver capable of receiving a meeting invitation request from a user, wherein the meeting invitation includes a set of attributes;
   a comparator capable of analyzing the set of attributes of the meeting invitation request;
   a selector capable of selecting a process from a set of predefined processes comprising a pending meeting indicator process, a multiple meeting display process, an availability probability process, and a prioritized list process to create a selected process;
   a rules processor capable of selectively modifying the selected process to create a modified process;
   a meeting invitation application capable of invoking the modified process to process the meeting invitation request; and
   a notifier capable of notifying the user.

9. The data processing system of claim 8 wherein the receiver capable of receiving a meeting request comprises:
a capability of receiving a plurality of requests.

10. The data processing system of claim 8 wherein the rules processor capable of selectively modifying the selected process comprises:
a capability of selectively modifying the process using preferences data.

11. The data processing system of claim 8 wherein the selected process of a pending meeting indicator process comprises:
a capability in which each of a pending meeting invitation instance communicates with each of another pending meeting invitation instance to share time and date attribute information.

12. The data processing system of claim 8 wherein the selected process of a multiple meeting process comprises:
a process in which selectively processing concurrent meeting invitations and selective enablement of an automatic decline notification occurs.

13. The data processing system of claim 8 wherein the selected process of an availability probability process comprises:
a process in which a user selectable activation button is placed in a graphical user interface and user notification of a calculated result associated with all required invitees occurs.

14. The data processing system of claim 8 wherein the selected process of a prioritized list process comprises:
a process that schedules a meeting for a selected meeting invitation in which a selected invitation is selected from a plurality of meeting invitations based on a priority of a requesting user within a prioritized list.

15. A computer program product for meeting invitation processing in a calendaring system, the computer program product comprising computer usable program code stored on a computer readable storage medium, the computer usable program code comprising:
computer usable program code for receiving a meeting invitation request from a user, wherein the meeting invitation includes a set of attributes;
computer usable program code for analyzing the set of attributes of the meeting invitation request;
computer usable program code for selecting a process from a set of predefined processes comprising a pending meeting indicator process, a multiple meeting display process, an availability probability process, and a prioritized list process to create a selected process;
computer usable program code for selectively modifying the selected process to create a modified process;
computer usable program code for invoking the modified process to process the meeting invitation request; and
computer usable program code for notifying the user.

16. The computer program product of claim 15 wherein computer usable program code for receiving a meeting request comprises:
computer usable program code for receiving a plurality of requests and computer usable program code for selectively modifying the process using preferences data.

17. The computer program product of claim 15 wherein the computer usable program code for the selected process of a pending meeting indicator process comprises:
computer usable program code for a process in which each of a pending meeting invitation instance communicates with each of another pending meeting invitation instance to share time and date attribute information.

18. The computer program product of claim 15 wherein the computer usable program code for the selected process of a multiple meeting process comprises:
computer usable program code for selectively processing concurrent meeting invitations and selective enablement of an automatic decline notification.

19. The computer program product of claim 15 wherein the computer usable program code for the selected process of an availability probability process comprises:
computer usable program code for placement of a user selectable activation button in a graphical user interface and user notification of a calculated result associated with all required invitees.

20. The computer program product of claim 15 wherein the computer usable program code for the selected process of a prioritized list process comprises:
computer usable program code for scheduling a meeting for a selected meeting invitation in which a selected invitation is selected from a plurality of meeting invitations based on a priority of a requesting user within a prioritized list.

* * * * *